Dec. 6, 1932.     G. A. MONTGOMERY     1,889,873
WELL TUBE AND ROTARY DRILL PIPE
Filed March 26, 1932
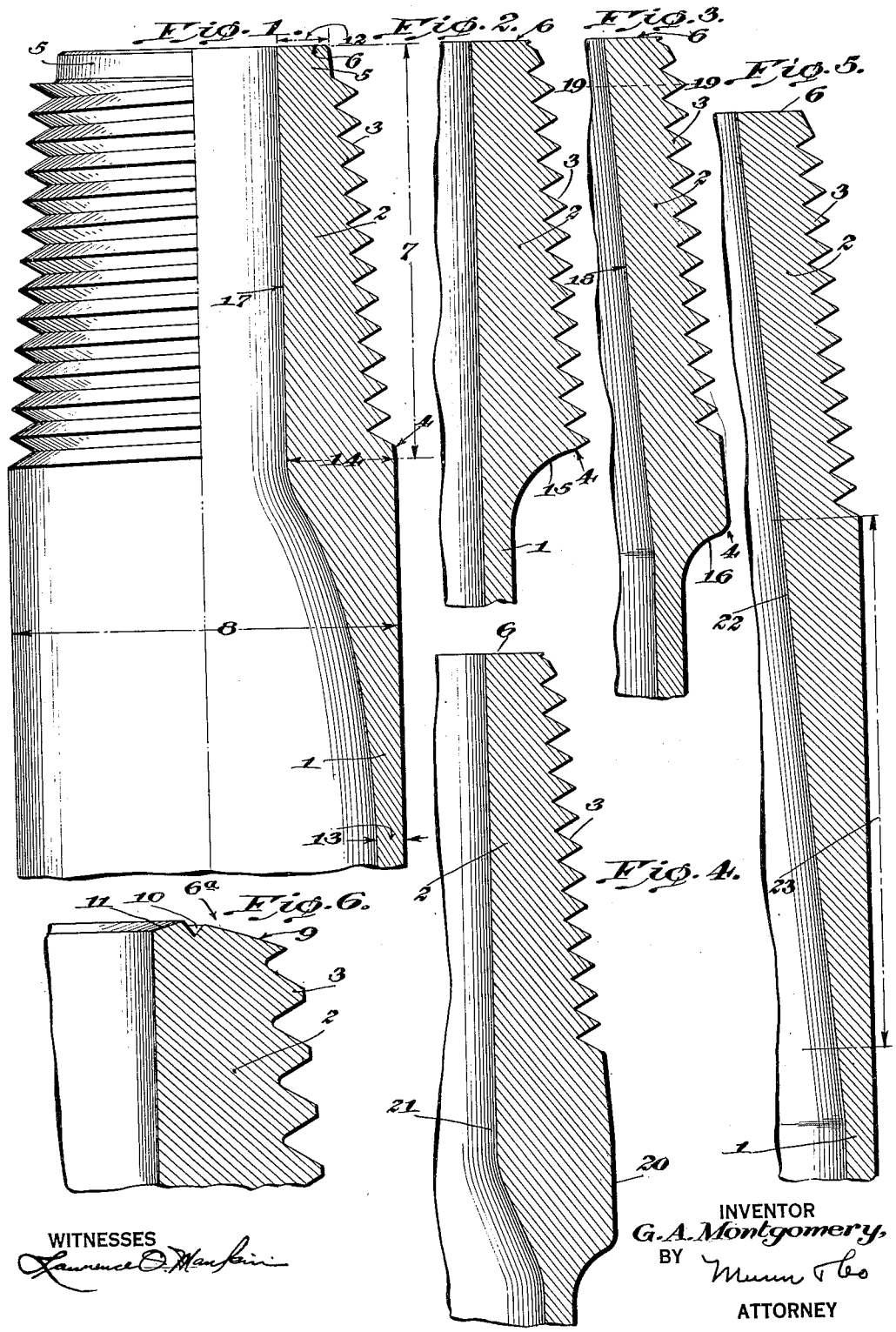
INVENTOR
G. A. Montgomery,
BY
ATTORNEY
WITNESSES Patented Dec. 6, 1932

1,889,873

UNITED STATES PATENT OFFICE

GUSTAVUS A. MONTGOMERY, OF DALLAS, TEXAS

WELL TUBE AND ROTARY DRILL PIPE

Application filed March 26, 1932. Serial No. 601,383.

This invention relates to improvements in tubing such as used for the conduction of crude oil from a well or such as used to compose the sections of a drill stem of the type as employed in the rotary system of drilling and its objects are as follows:—

First, to provide a pipe with a taper-threaded pin having a seal-off end with a surface or surfaces of revolution of any preconceived cross-sectional contour, said surface lying wholly on one side of the axis of revolution and concentric to the axis of the thread cone.

Second, to provide a pipe having a threaded pin with a mechanically faced seal-off end of an area exceeding the thickness of the pipe at any cross-sectional plane in its normal diameter, the purpose of the enlargement of said seal-off end being to coact with a corresponding flange or other abutment in a coupling sleeve for absolutely fixing the internal stopping place of the pin end, so that the pin end cannot be screwed farther into the sleeve when the latter is expanded by heat in the well bore, or that fluid cannot leak past the connection to enter the thread passages.

Third, to provide a pipe having a pin which is made so massive and on which the threads are so coarse as to confine the creep of the metal to the body of the pipe and prevent creep in the pin when screwed home in its coupling sleeve.

Fourth, to provide a pipe with a pin having a mechanically faced seal-off end of substantial area, which end is solely relied upon to establish a seal with the coupling sleeve thus enabling the pin threads to be cut according to what might be called a rough job which is completed relatively cheaply, thus eliminating the expensive precision work customarily required in cutting threads for first class pipe fitting which is necessary where the threads are depended upon to make a pressure-tight joint.

Fifth, to provide a pin end for drill stem piping or well tubing which is capable of being screwed home quickly and completely in a coupling sleeve without danger of overheating and consequently striking fire to either oil or gas, said facility being the result of making the thread cone on a taper of 2" to 3" per foot and the threads so coarse that there will be only 3 to 6 per inch, the latter provision enabling the screwing home of the pin end with only three or four complete revolutions and a fractional turn to establish the final seal-off of the pin end.

Sixth, to provide a pin of such a simplified design that its manufacture requires only a few heatings and upsetting operations in order to produce a sufficiently massive stock into which to cut the threads, this simplification in manufacture having the beneficial effect of producing the least possible molecular disturbance as distinguished from previously known types of pins which, because of their relatively elaborate designs require repeated heatings and upsetting operations and thereby entail considerable fire losses, weaken the fabric of the pin and materially shorten the ultimate length of the pipe or tube.

Other objects and advantages will appear in the following specification, reference being had to the accompanying drawing in which Figure 1 is a partially elevational and sectional view of a portion of a drill stem pipe, particularly illustrating the improved pin.

Figure 2 is a detail sectional view of a portion of a well tube again illustrating the principles of the improved pin.

Figure 3 is a view similar to Figure 2 illustrating a modification in the upset on which the pin is formed, this embodiment being in a drill stem.

Figure 4 is a view similar to Figure 3 illustrating a further modification in the upset.

Figure 5 is a view similar to Figure 3 illustrating another modification in the upset.

Figure 6 is a detail sectional view illustrating one of a variety of a surface or surfaces of revolution producing a preconceived cross-sectional contour of the seal-off end, the principle of this formation being explained later.

The invention is primarily dedicated to use in connection with oil wells and is largely intended for embodiment in well tubing, such as used for conducting crude oil from a well, and in drill stems such as employed by rotary drilling apparatus. These uses are not intended to be understood as limitations because it is conceivable that the principle of the invention is adaptable to other purposes, but the deficiencies of tubing and piping for the purposes specifically announced are so well known and so openly acknowledged by persons conversant with the art that the invention is first advanced as a means of overcoming the known difficulties in this particular art.

Much can be related on the theoretical side of the manufacture and use of pins, as the threaded ends of tubes and pipes are commonly called. The following description avoids all discussion of theory and comprises only statements of results which have been proved by actual practice. The description necessarily embraces some fine distinctions but the definitions of those distinctions are not theoretical.

This application is a continuation in part of a copending application for patent for tubular coupling, filed by Gustavus A. Montgomery June 24, 1929, Serial No. 373,355. The sub-combination of the tubular coupling in that application consists of a conduit 1 which, in Figure 1, 3, 4 and 5 is to be identified as a pipe and in Figure 2 is a tube. The distinction is that the form of the invention in Figure 2 is particularly adaptable to well tubing in which it is essential to have a continuous bore of uniform diameter, whereas in Figures 1, 3, 4 and 5 the form of the invention is particularly adaptable to a drill stem.

Consider Figure 1 first. The pipe 1 is upset at its ends to produce a pin 2 of a relatively massive formation. Coarse threads 3 are cut or otherwise formed on the external surface of the pin, these threads being so coarse that there will be only from three to six threads per linear inch. In all instances the thread cone merges into the normal diameter of the pipe 1 either directly as in Figures 1 and 5 or by a drop below the base 4 of the thread cone. This is a special provision which eliminates any type of shoulder protruding circumferentially beyond the thread cone, the result being that the screwing of the pin 2 into the box of a coupling sleeve (not shown) is not limited by such shoulder.

The pin 2 has a reduced nipple 5 on its extremity which nipple is free from threads and in the particular instance in Figure 1 is provided with a flat, transverse face 6 lying in a plane at right angles to the longitudinal axis of the thread cone. This face, which forms the seal-off end of the pin, is preferably tempered to a required degree of hardness and is smoothed and polished so as to form a thrust surface.

The reference characters used thus far designate corresponding parts in Figures 2, 3, 4 and 5. In all of these instances the face 6 is to be regarded as the liquid seal-off even though it is not part of an unthreaded reduced nipple. The threads of the thread cone 3 are made to diminish and finally disappear before they reach the face 6 in Figures 2, 3, 4 and 5 thereby leaving the seal-off face as unobstructed as in Figure 1.

It is important to observe that the longitudinal dimension 7 of the pin 2 is substantially as long as the normal diameter 8 of the pipe 1. In most instances the dimension 7 may be greater than the dimension 8 for the purpose of insuring a sufficiently long cone which can be cut with a sufficient number of coarse threads to insure against shearing under the enormous torque to which the threads are subjected. The diameter 8 of the pipe 1 is to be taken as a gauge by which the length of the threaded pin 2 is substantially determined. Taking a pipe of a known diameter, the length of the pin 2 to be determined will about equal said diameter and in some cases exceed it as already brought out.

The statement has been made that the face 6 (Fig. 1) lies in a plane at right angles to the axis of the thread cone. This is a limitation which is expressly disclaimed because the end 6 will be made with any surface or surfaces of revolution of any preconceived radial cross-sectional contour. This feature is illustrated in Figure 6 wherein the face 6ª first comprises a spherical convexity 9, a V notch 10 and a flat but biased portion 11.

According to "Machinery's Handbook", by the Industrial Press of New York, second edition, 1914, page 144, Pappus' or Guldinus' rules state certain formulas by means of which "the area of any surface of revolution and the volume of a solid of revolution may be found."

In order to visualize the meaning of the quoted statement one must picture a preconceived radial cross-sectional contour as illustrated in Figure 6 and then imagine that contour as being swept around in a revolution about the axis of the pin or thread cone, provided that the contour lies on one side of the axis of revolution. The plane or surface thus generated will be concentric to the axis of the pin or thread cone, and no matter how intricate the cross-sectional contour may be the surface will be absolutely uniform in the circumferential direction.

This definition may appear intricate but its application has a very simple and practical purpose. When cutting the threads 3 there is a reasonably exact assurance that they will be cut strictly on the axis of the pin 2. The axis of the pin 2 may or may not coincide with the axis of the pipe 1. Bearing in mind that the pipe 1 is something like 30' long, it is easy to understand that the body of the pipe may be bowed and in any event not true to its pin extremity.

Prior to cutting the threads 3 the truncated pin cone 2 is sized in an engine lathe or similar machine, whereupon the threads 3 are cut by means of a milling cutter or by a single point tool. Then while the pipe is still held in the indentical position in the lathe the seal-off end 6 is faced with a suitable tool while the pin turns on the identical axis on which it turned while the thread was being cut. After having determined the cross-sectional contour of the seal-off end, said contour will be generated as a surface or surfaces of a revolution concentric to the thread cone axis so that when the pin 2 is screwed into its box the face 6 or 6ª will exactly seat against the conforming abutment in the box at every point so as to provide an internal seal-off which is entirely independent of any sealing-off function which the threads 3 might be supposed to have.

By upsetting the pipe 1 so as to form the pin 2 one of the purposes is to enable making the face 6, 6ª of substantial breadth. The broadening of the face is not merely incidental but has the express purpose of augmenting the seal-off. Actually the cross-sectional dimension 12 of the seal-off end exceeds the cross-sectional dimension 13 of the pipe 1 by an arbitrary amount but which is always more than the cross-section of the pipe. A mere carrying forward of the pipe thickness to the seal-off end is not sufficient to provide a contact surface capable of sustaining the enormous thrust to which the end is subjected.

The dimension 14 (Fig. 1) of the base 4 exceeds the dimension 12 also by an arbitrary amount. The base 4 is made heaviest of all cross sections in several of the forms of the invention (Figures 1, 2 and 4) in order to illustrate a provision against what is known as the "notch effect" of the threads. Not a great deal is known about this effect but by experimentation it has been determined that the tendency of a pipe to break is generally confined to the place where the last scratch of the thread on the pin occurs. Great pressures are concentrated on the threaded pin and inasmuch as the last scratch constitutes a notch the result is a breakage at the notch on a principle similar to notching a piece of wood, etc. to produce a weakened point where a break can be made to occur.

By making the base 4 heaviest of all cross sections in Figures 1, 2 and 4 the foregoing notch effect of the last thread will be totally nullified. In other words, such weakening as may be attributed to the last thread is counteracted by the increased cross section of the base 4 into which the last thread is cut.

Breakage is not likely to occur in the forms in Figures 2 and 3 because there the relieved places 15, 16 provide overhangs at which the last thread will trail out into a void. The notch effect, as previously described, appears to be paradoxical in that the breakage or fatigue of the metal occurs at the last scratch of the thread and not in the threaded region itself. In Figures 2 and 3 the full depth thread continues until it disappears beyond the relieved places 15 and 16.

It is important to understand another purpose of the enlarged seal-off end 6. In screwing the pin 2 into the box of a coupling sleeve there will be an expansion of the box due to the screwing in of the pin 2 and a compression of the pin 2 by virtue of the reluctance of the box to be expanded. The instant pipe is predicated on a condition wherein the torque or twisting effect of the pin 2 in reference to the coupling sleeve box must not exceed the elastic limits of the metal.

If this condition were permissible then the screw threads of the pin and box would engage so tightly as to defy separation of the joint by ordinary methods upon extracting the string from the well. Such union of the threads is definitely prevented by making the threads coarse, but it is particularly prevented by using the face 6 as one component of a stopping point which limits the screwing in of the pin 2. A coupling sleeve of the type herein contemplated has an internal flange or some equivalent abutment. By properly locating said abutment the engagement of the face 6 therewith will provide an internal stopping place for the pin end, thereby absolutely fixing said stopping place and preventing further screwing in under any circumstance.

The possibility of such further screwing in is prevalent with known types of tools or pipes and occurs as follows:—A coupling sleeve is usually of great volume, certainly larger than the pin of a tube or drill stem pipe. The coupling sleeve is likely to become heated in the bore either by frictional contact with the walls of the bore or by the natural heat in the bore which sometimes exceeds 200° F. When the coupling sleeve is thus heated it expands to a greater degree than does the pin. This permits a further screwing in of the pin by virtue of the natural rotation of the drill stem.

Now when the drill stem is brought to the surface, the then cooled coupling sleeve exercises a grip on the pin so tightly that it is found impossible to unscrew the joint. Tong pressures have actually been applied under such circumstances with a force great enough to collapse the pipe rather than to cause a yielding of the threaded joint.

It will be understood that when the entry of the pin 2 (Fig. 1) is gauged by the contact of its face 6 with an internal abutment the insertion of the pin is absolutely limited or fixed so that even if there should be a subsequent heating of the coupling sleeve box there will not be any further screwing up effect. The result is that the joint is as readily broken after an extended period of use as when it was originally screwed up.

Mention has been made of the massiveness of the pin 2. Another purpose lying behind this is to divert any tendency of the steel to creep within the realm of the pin. It is known that "creep" occurs in steel tubing and piping, and some investigators hold that creep does not cease at any particular temperature, but rather that it goes on at all temperatures, decreasing in rate so rapidly, however, with lowered temperature as to become almost negligible below some temperature (Piping Handbook by Walker and Crocker, McGraw-Hill Book Co., Inc., second edition 1931, pages 275, 276).

Anticipating that it is impossible to prevent creep in the pipe 1, that is to say a molecular distribution under stress of the various pressure factors to which the pipe is subjected, the purpose is to make the pin 2, at least, so massive and generally dependable that creep will not extend to the pin and disturb its disposition in the box of its coupling sleeve.

Another purpose in making the face 6 of abnormally large area is to enable placing sole reliance on the seal-off quality of said face without having to depend on the threads 3 for a pressure-tight joint. Thread cutting for well tubes and drill stem pipe is usually expensive precision work which is necessitated by the requirement of smooth, clean threads which will go together easily and which will be and remain pressure-tight (Piping Handbook, supra, pages 337, 338). It is known that threads alone will not prevent a seepage of liquid, and that when a leak ever starts the tremendous force behind the liquid causes the sand to blast a hole directly through the coupling box.

By establishing an internal seal-off at the face 6 the liquid will never reach the threads 3, and what is more important and in line with the foregoing citation it is therefore possible to cut the threads 3 according to what might be called a rough job. In other words, the usual precision can be avoided, the only requirement being coarse threads that are cut so that they will mesh with the threads of the box and enable a tight hold. The ample seal-off face 6 is relied upon to hold the pressure.

Coarse threads and an acutely tapered thread core 3 have been repeatedly emphasized in the foregoing description. These factors have the additional purpose of enabling the rapid screwing up of a joint. This screwing up is accomplished quickly and easily with so little actual friction that no appreciable heat is engendered. This facility avoids the possibility of striking fire at the well.

This condition is explained as follows: In oil well practice pipe for rotary drilling running in sizes from 2½" to 6" are scheduled at 8 threads per inch (National Pipe Standards, by National Tube Company, Pittsburgh, Pa., 1917, page 54), while external upset tubing in 3" and 4" sizes is scheduled at ten threads per inch (National Pipe Standards supra, page 30).

In screwing up such pipe and tubing it has actually been demonstrated that the enormous friction set up in the threads by tonging can heat the joint to such an extent as to set gas and oil afire. The heat is engendered by having to screw home a comparatively large number of threads.

As indicated above, the possibility of firing gas and oil is eliminated by constructing the thread cone 3 on an acute taper which will enable the connection of the pin and box to such an extent that only three or four complete revolutions are necessary to complete the joint. After that only a fraction of a turn is necessary to set up the abnormally high friction between the face 6 and its abutment to compose the ultimate seal-off.

Reference has been made to the enormous torque to which the threads are subjected in screwing up as well as to the limitation of expansion and compression, respectively in the coupling box and on the pin, by the engagement of the seal-off face 6 with an internal abutment in the box. This expansion and compression is confined by the face 6 to a point below the elastic limits of the metal, and in practice plays a part in the following effect:—

In revolving a drill stem it happens occasionally that the bit at the bottom will encounter an obstruction which will not yield so readily. Inasmuch as the rotary drive machinery at the top continues at a uniform rate it follows that the drill stem will receive a twist. Presently when the obstruction yields, the stored torque or twist in the drill stem will cause the tool to snap forwardly or ahead in the direction of rotation. This has an unscrewing effect and will actually unscrew such pins as happen to be screwed up least tightly.

The seal-off face 6 remedies this condition in the following manner:—The factor of friction between the face 6 and its abutment is so great that the internal fluid seal will not be broken even though the elastic remnant of the metal in the pin and box permits an infinitesimal unscrewing of the pin. In other words, the back-lash or reverse torque of the drill pipe upon freeing the tool from a temporary obstruction is capable of being dissipated by an infinitesimal unscrewing effect of the pins such as 2 without breaking the internal fluid seal at the faces such as 6.

In Figure 1 the bore 17 of the pin 2 is cylindrical. This bore merges into the bore of the pipe 1 by means of a properly designed ogee curve in back of the base 4. In Figure 2 the bore of the tubing 1 is to be regarded as cylindrical from one end to the other without any interruption as in Figure 1. The type in Figure 2 is intended as well tubing, and when a seal-off is made at 6 with the internal abutment of a coupling sleeve box there will be an almost imperceptible crack at the place where the joint occurs, and not any open place whatsoever which would be likely to set up eddy currents and cause emulsification of the oil. Moreover, the absolutely flush joint at 6 will permit a perfectly free passage of tools which must be inserted in the tubing string, for example swabs.

In Figure 3 the bore 18 of the pin 2 is tapered in conformity with the taper of the thread cone itself. The base 4 is located somewhat lower than it is in Figures 1 and 2. The purpose of this provision is to enable the renewal of the threads 3 in the event of some unintended deformation of the seal-off face 6. It will be understood that in the event of damage to the face 6, the pin can be cut off at say line 19, 19, and upon continuing the threads 3 down past the base 4 the pin 2 will be restored to its original condition.

The same provision obtains in Figure 4, although here the threads 3 would run out on the straight or cylindrical outer wall 20 at which the thread cone terminates. The bore 21 of the pin 2 is cylindrical as in the instance of Figure 1.

Here the base portion of the upset pin is divided substantially equally on opposite sides of the pipe thus establishing a balanced distribution of the base metal. It is to be noted that the external taper of the pin so disposes the threads that the valley of the smallest thread falls substantially in line with the outer circumference of the pipe. This particular feature also occurs in Fig. 3.

In Figure 5 the bore 22 is tapered to agree with the taper of the thread cone, but this form is a composite of Figures 1 and 3 in that the thread cone merges directly with the outside diameter of the pipe 1 and the wall of the bore 22 is parallel to the thread cone. The purpose of this arrangement is to provide a reinforced zone 23 approximately between the lines indicated in Figure 4 for the purpose of resisting the crushing of the pipe by the tongs.

I claim:

1. For use in a drill stem or well tube, a pipe having a thickened pin portion adapted to enter the box of a coupling, said pin portion being externally tapered from two to three inches per linear foot and having relatively few continuous screw threads per linear inch, said taper and threads being matched in the box and enabling a quick connection without high heating, the extremity of the pin having a relatively broad annular area to make contact with a corresponding abutment in the box, said area being mechanically faced to be concentric with the axis of the pin at every circumferential point so as to exactly seat against said abutment thereby forming a tight seal to prevent passage of fluid into the threads of the connection.

2. For use in a drill stem or well tube, a pipe having a thickened pin portion adapted to enter the box of a coupling, said pin portion being externally tapered and having relatively few continuous screw threads per linear inch, said taper and threads being matched in the box and enabling a quick connection without high heating, the extremity of the pin having an interrupted contour in the radial direction, said contour being generated as the surface of a revolution of which the axis of the pin is the center to make contact with a corresponding abutment in the box and to exactly seat against said abutment thereby forming a tight seal to prevent passage of fluid into the threads of the connection.

3. For use in a drill stem or well tube, a pipe having an externally threaded pin portion on an end of the pipe to be screwed into the correspondingly threaded box of a coupling, said pin portion comprising an upset having its base portion divided substantially equally on opposite sides of the pipe to establish a balanced distribution of the base metal, the exterior of the pin being tapered so that the valley of the smallest thread falls substantially in line with the outer circumference of the pipe, the interior wall of the upset being parallel to the axis of the pin to form a cylindrical bore, said bore merging with the interior of the pipe in the region of said base, and said pin having a relatively broad annular area to make contact with a corresponding abutment in the box so as to exactly seat against said abutment thereby forming a tight seal to prevent passage of fluid into the threads of the connection.

4. For use in a drill stem or well tube, a pipe having a thickened pin portion adapted to enter the box of a coupling, said pin portion being externally tapered and having relatively few continuous screw threads per linear inch, said taper and threads being matched in the box and enabling a quick connection without high heating, said pin portion also having an internal taper parallel to the threads and extending uninterruptedly beyond the termination of the threads to a point of mergence with the pipe bore said point being at a distance from said termination approximately equal to the total length of the threads, the extremity of the pin having a relatively broad annular area to make contact with a corresponding abutment in the box so as to exactly seat against said abutment thereby forming a tight seal to prevent passage of fluid into the threads of the connection.

GUSTAVUS A. MONTGOMERY.